April 1, 1930.  T. W. CASE  1,753,002
CAMERA
Filed Aug. 22, 1924  4 Sheets-Sheet 1

WITNESS

INVENTOR
Theodore W. Case
BY Denison Thompson
ATTORNEYS

April 1, 1930.                T. W. CASE                1,753,002
                               CAMERA
                         Filed Aug. 22, 1924          4 Sheets-Sheet 2

April 1, 1930.　　　　　T. W. CASE　　　　　1,753,002
CAMERA
Filed Aug. 22, 1924　　　4 Sheets-Sheet 3
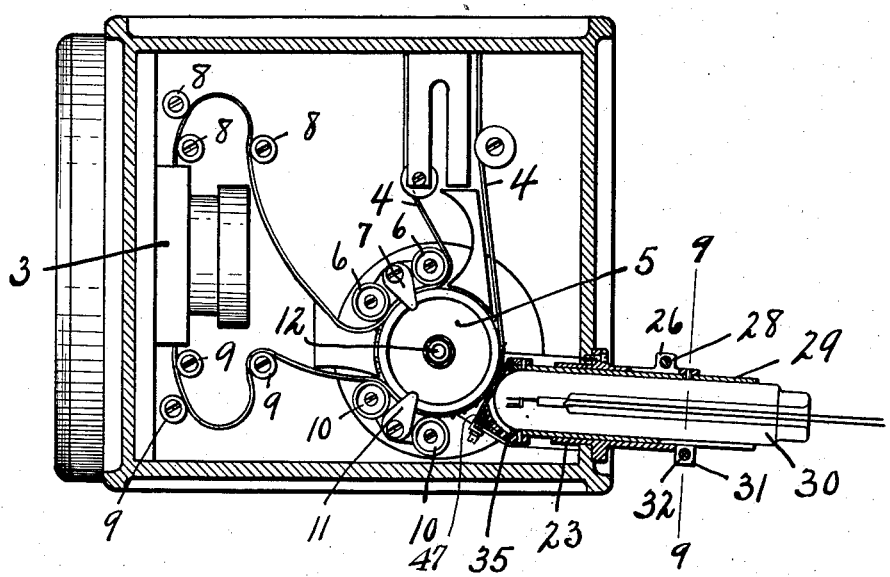
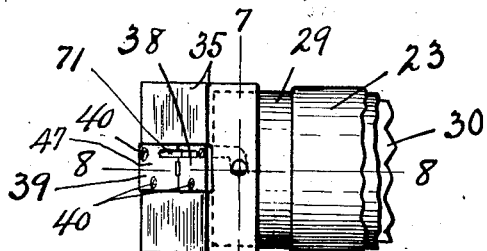
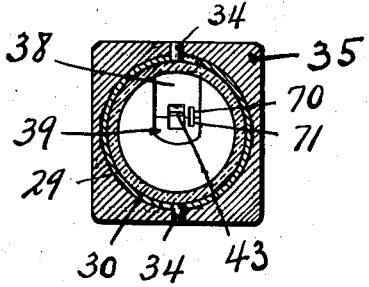
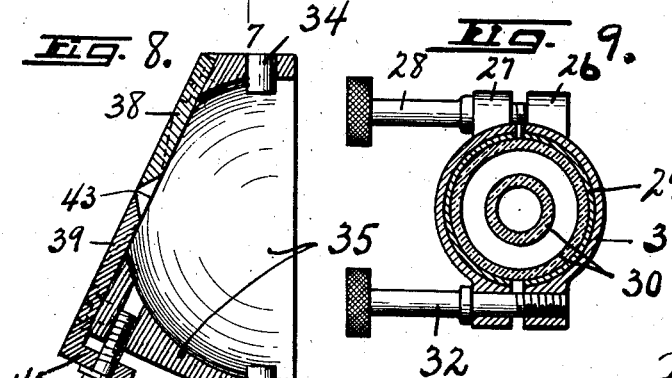

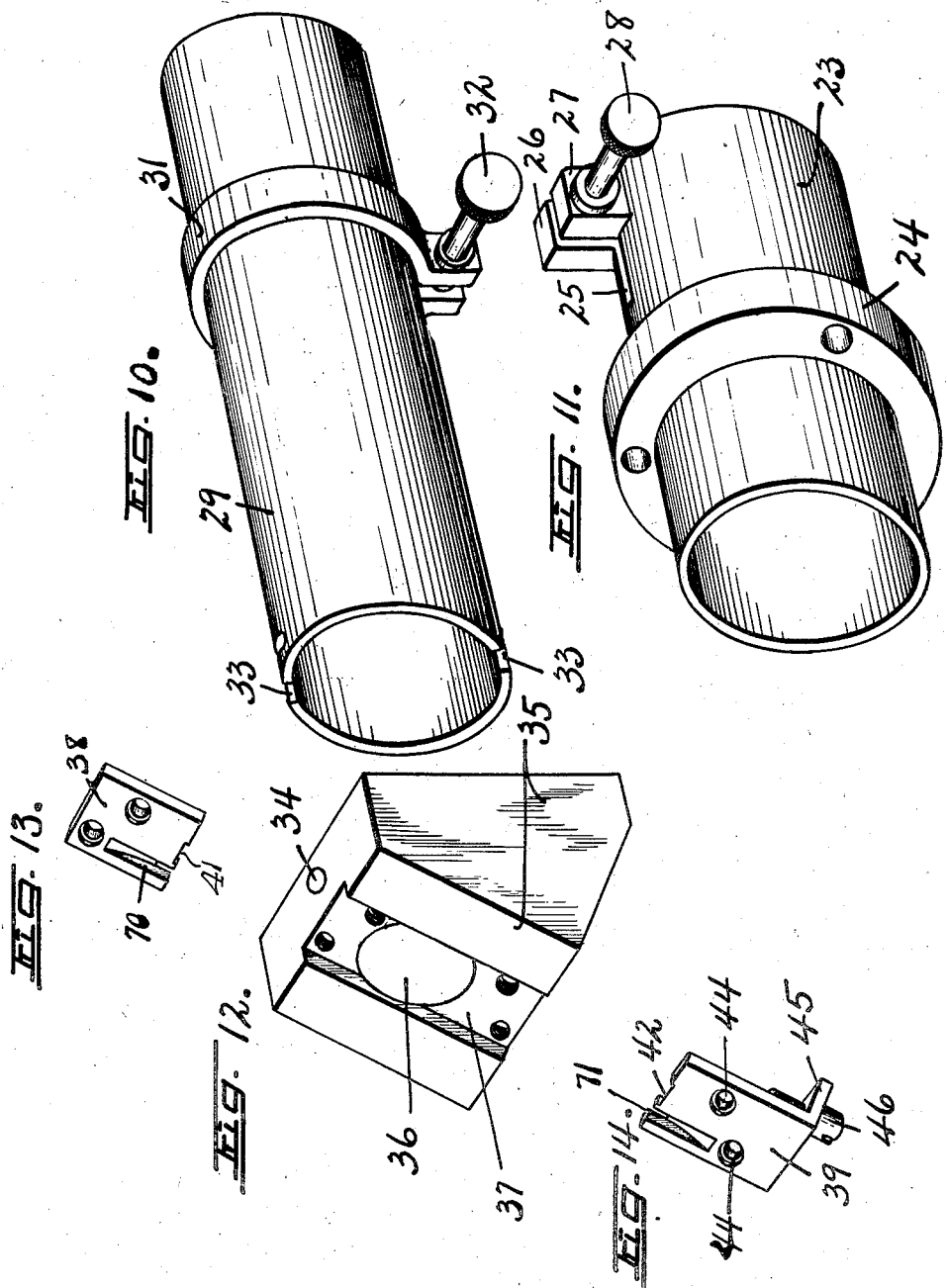

Patented Apr. 1, 1930

1,753,002

UNITED STATES PATENT OFFICE

THEODORE WILLARD CASE, OF AUBURN, NEW YORK, ASSIGNOR TO CASE RESEARCH LABORATORY, INC., OF AUBURN, NEW YORK, A CORPORATION OF NEW YORK

CAMERA

Application filed August 22, 1924. Serial No. 733,560.

This invention relates to certain improvements in cameras, for taking sound pictures, preferably in conjunction with ordinary moving pictures, and more specifically to a camera for photographing light waves as varied in accordance with sound waves upon a photographic film combined with the regular moving pictures photographed upon the same film.

The primary object of the invention is the production of a highly efficient and comparatively simple apparatus which utilizes portions of a regular moving picture camera for subjecting a part of a moving picture film, while moving through the regular camera and at a point therein where uniform and regular speed can be assured, to light rays as varied by sound waves which pass through a narrow slot or a light-transferring medium of suitable shape and size past which the film moves.

Other objects and advantages relate to the details of the structure for accomplishing the above object, as for instance, the adjustability of the lamp or source of light to vary the intensity of the light to which the film is subjected, the movability of the jaw-holder-block to permit threading of the film around the feed and take-up sprocket, the adjustability of the jaws for varying the size of the printing slot, the means utilized for assuring uniform and regular travel of the sprocket, etc., all as will more fully appear from the following description taken in connection with the accompanying drawings in which:—

Figure 5 is a section on line 5—5, Figure 1.

Figure 6 is a view of the lamp casing including the jaw holder block and the jaws.

Figure 7 is a section on line 7—7, Figure 6.

Figure 8 is a section through the jaw-holder block and the jaws on line 8—8, Figure 6.

Figure 9 is a section on line 9—9, Figure 5.

Figure 10 is a perspective view of the lamp-supporting tube.

Figure 11 is a perspective view of the tube secured to and extending through a wall of the camera for adjustably carrying the tube of Figure 10.

Figure 12 is a perspective view of the jaw-holder block or cap.

Figures 13 and 14 are respectively specific views of the jaws.

Figure 1:
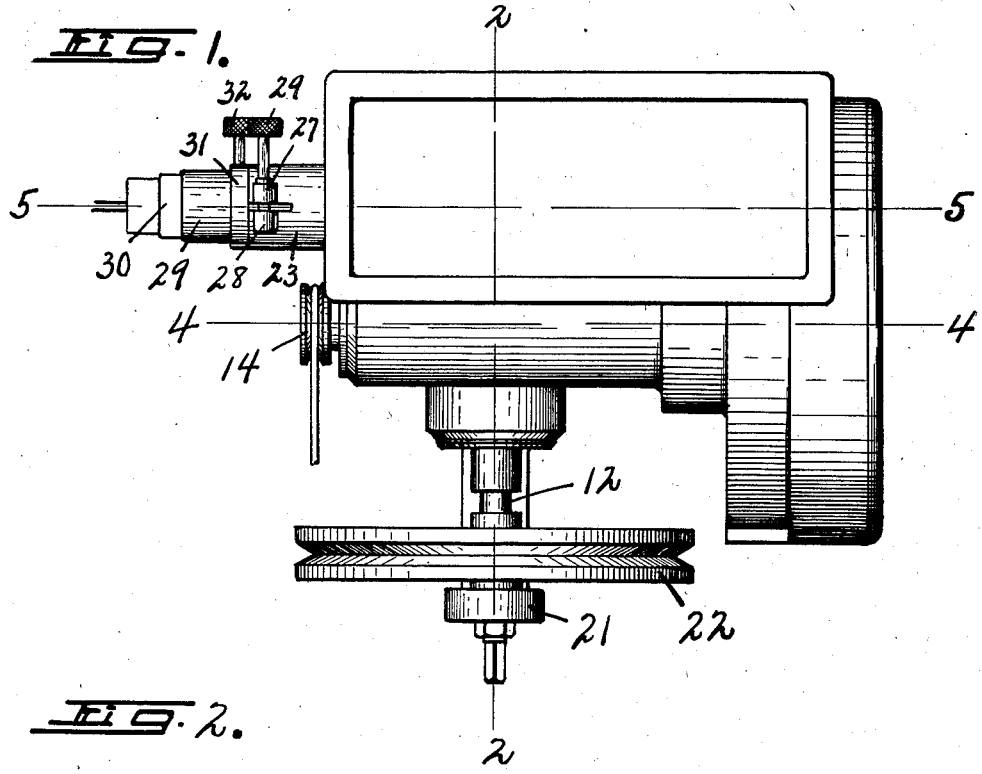
Figure 1 is a top plan view of the camera.
Figure 2:
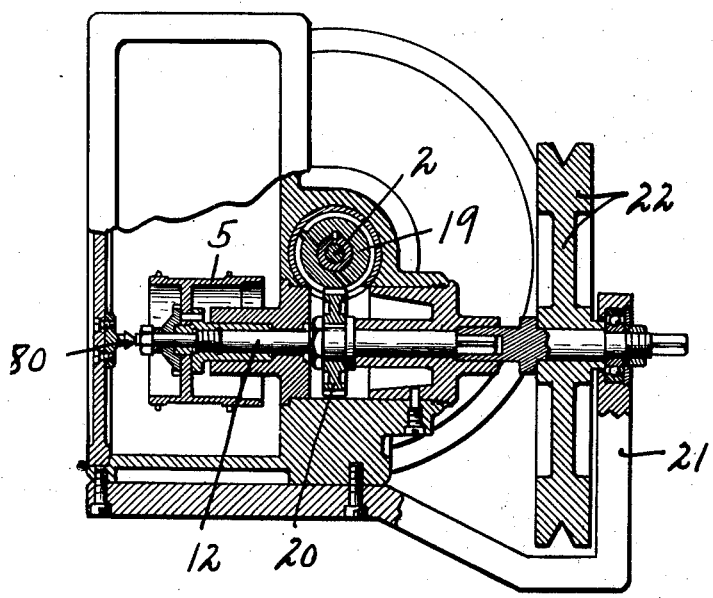
Figure 2 is a view partially in section on line 2—2, Figure 1.

The invention here is illustrated in connection with the standard cinematograph camera substantially as shown in Patent No. 1,509,556, and as the standard features of this camera form no portion of the invention here described, it will be only necessary to describe those features in connection with which changes have been made.

In a general way the camera includes a suitable shutter —1— and shutter-operating shaft —2— and a suitable intermittent or shuttle mechanism —3—, all of well known construction.

The film —4— in the usual manner is fed downwardly into the camera casing from a suitable magazine (not shown) and passes around the upper side of the feed and take-up sprocket —5— held in place by the upper guide rollers —6— and the upper roller latch —7—. From the rollers the film is looped around or guided by other rollers —8— which direct the film to the intermittent or shuttle mechanism —3— and it passes from the mechanism —3— around or guided by other rollers —9— and then around the lower portion of the feed and take-up sprocket —5— held in place against the sprocket —5— by the lower guide rollers —10— and the lower roller-latch —11— in the usual manner.

The film then passes upwardly around the feed and take-up sprocket —5— and outwardly through the upper portion of the camera casing to the usual magazine (not shown), and it is at the point where the film passes upwardly around the feed and take-up sprocket that it is subjected to light rays varied in accordance with sound waves for producing upon the film a record that may be re-translated into the original sound waves.

It is essential that the feed and take-up sprocket be driven at a regular and uniform rate of speed in order that a substantially perfect record can be made upon the film, and for that reason instead of driving the sprocket shaft —12— in the usual manner in which a driven shaft additional to those here illustrated is utilized, the shutter-operating shaft —2— is provided with a pulley —14— which may be driven in any suitable manner, as for instance, by belt to a motor, or otherwise as may be desired.

This shaft —2— drives a friction disk —14'— in the usual manner for driving the shutter —1— and the shutter —1— drives back through sleeve —16— and gear —17— for actuating the intermittent mechanism to a sleeve —18— surrounding the shaft —12— and having a worm —19— splined thereto. This worm —19— in turn drives the worm-gear —20— mounted on and splined to the feed and take-up sprocket shaft —12—, and by this mechanism including the worm and worm gear a very uniform and regular drive of the feed and take-up sprocket is effected. In addition, the sprocket-shaft —12— is extended outwardly beyond the camera casing, and has its outer end journaled in a bracket —21— which may be an extension from the camera casing, and on this extension of the shaft —12— there is mounted a flywheel or balance wheel —22— which assists in assuring steady and regular rotary movement of the feed and take-up sprocket —5—.

Further, the end of the shaft —12— is preferably provided with a countersunk tapered recess and the hinged door of the camera casing is provided with a conical or tapered bearing 80 adapted to fit in said recess when the door is closed to additionally steady the sprocket in its rotary movement.

The operation of the moving picture camera parts of the apparatus are well known, and in the use to which they are applied in this application, they are operated in the usual and well-known manner not herein necessary to illustrate in detail or describe.

For the purpose of producing upon the film —4— a record of light wave variations while the film is moving around the feed and take-up sprocket, and after the moving pictures have been taken thereon, the wall of the camera adjacent the sprocket —5— is formed with an opening adapted to receive the tube —23— best illustrated in Figures 5 and 11, and this tube is formed with a flange —24— which abuts against the outer side of the camera casing, and is secured thereto in any suitable manner as by screws or otherwise.

The rear portion of the tube —23— is preferably formed, as shown, with an elongated lengthwise slot —25— and lugs —26— and —27— on the tube at opposite sides of the slot, one of the lugs being threaded and provided with screw —28— adapted to draw the opposite edges of the slot —25— toward each other to thereby cause the tube —23— to tightly grip the lamp-supporting tube —29— when the latter is placed within the former, and preferably the tube —23— is of an interior diameter substantially equal to the exterior diameter of the tube —29—. Tube —29— is of a size adapted to receive the lamp —30— and is preferably as shown provided with an elongated slot at its rear and extending lengthwise of the tube and with a clamping ring —31— extending around the tube and provided with screw —32— for contracting the ring to thereby contract the rear portion of the tube —29— and cause it to tightly grip the glass or other bulb of the lamp —30— and hold the same rigidly in proper position with respect to the feed and take-up sprocket —5—. The forward end of the tube —29— is provided with a pair of opposed bayonet slots —33— for engagement respectively with the opposed pins —34— formed in opposite sides of the jaw-holder block or cap —35—, and this cap is slipped over the forward end of tube —29— with the pins in registration with respective slots and then given a slight turn to lock the cap or block in desired position. The jaw-holder block —35— is provided with an opening —36— aligned with the opening through the tube —29— when the parts are assembled and leading to a groove or channel —37— in the front face of the jaw-holder block for the reception of a pair of jaws —38— and —39— adapted to fit in the slot, and these jaws may be secured in position in any suitable manner, as by means of screws —40— passed through opening in the jaws as illustrated, and engaged with the jaw-holder block —35—. These jaws at their meeting edges are each provided with a transverse recess —41— and —42— respectively formed with under-cut portions as perhaps best illustrated in Figure 8, and when the jaws are secured in position with their adjacent edges in contact, the recesses —41— and —42— register so as to form the printing slot —43— of desired width and length, as for illustration, .0015 of an inch in width and .1 of an inch in length. Slight adjustment only is required as to the size of this slot, and that is provided for by making the openings —44— through the jaw —39— slightly larger than the screws —40— and the jaw —39— is provided with a flange —45— equipped with an adjusting screw —46— that has a threaded engagement with the jaw-holder block —35— whereby turning of the screw —46— will effect the desired minute adjustment of the slot —43—. The jaws —38— and —39— are provided with aligned vertical slots or cut away portions —70— and —71— respectively, which provide a longitudinal slot or groove in which the film-carrying sprocket teeth on the sprocket —5— can run when the jaw-holder block —35— is in a position where the film —4— runs in tight relation with the jaws —38— and —39—.

The forward face —47— inclines forwardly and downwardly as illustrated, so as to lie substantially tangential to the feed and take-up sprocket —5— when the parts are assembled in operative position for producing a record upon the film —4—, all as perhaps best illustrated in Figure 5, and it will be noticed that the film as it draws around the feed and take-up sprocket is tensioned tightly across the slot —43— formed by the jaws —38— and —39—.

When it is desired to thread the film upon the sprocket —5— it is only necessary to release or partially release the screw —28— and then draw the tube —29— carrying the lamp —30— rearwardly so as to carry the jaw-holder block or cap —35— with the jaws mounted thereon away from the sprocket. This structure provides any desired adjustment of the lamp and the jaw-holder block and in like manner by releasing the screw —32— the lamp —30— may be adjusted within the tube —29— to any desired position.

It has been found in actual practice that by this structure utilizing means such as the worm —19— and worm-gear —20— and the flywheel —22— in combination with the lamp —30— positioned and equipped as described, an accurate record of light variations can be produced upon the film —4— while it is traveling around the usual feed and take-up sprocket of an ordinary moving picture camera, thereby eliminating the necessity of the provision of separate and independent mechanism for taking sound pictures.

Figure 3:
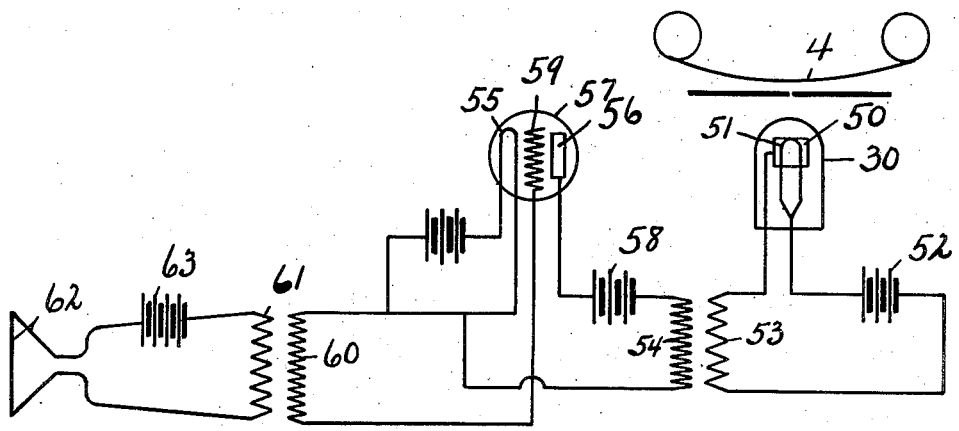
Figure 3 is a diagrammatic illustration of the lamp and the means for varying the light rays in accordance with sound waves.
Figure 4:
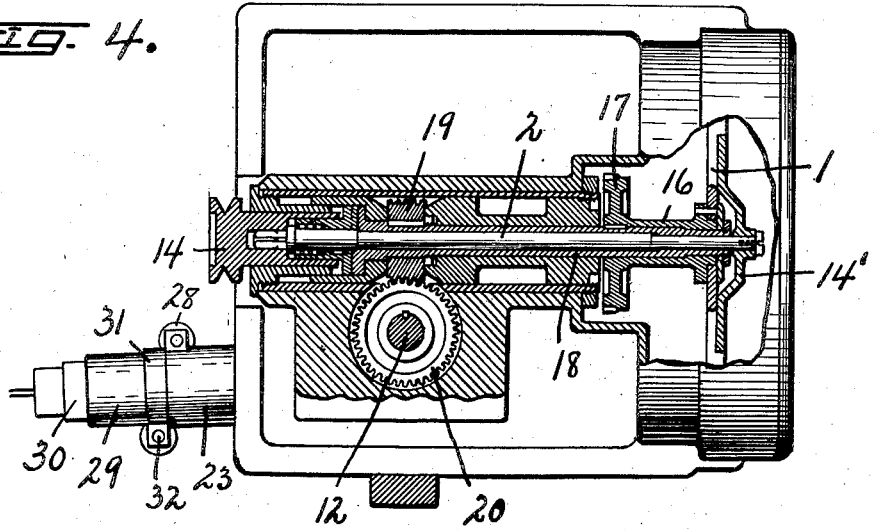
Figure 4 is a section on line 4—4, Figure 1.

Any suitable means for varying the rays of light emanating from the lamp —30— in accordance with sound waves may be provided and for illustration in Figure 3 I have shown the lamp —30— as including two spaced, but closely associated electrodes —50— and —51— connected in circuit with a source of potential as the battery —52— and the secondary —53— of a transformer, the primary —54— of which is connected in circuit with a filament —55— and plate —56— of an audionic device —57—, such circuit including a source of potential as battery —58—.

The filament —55— and grid —59— of the device —57— are connected in circuit with the secondary —60— of a transformer the primary —61— of which is connected in circuit with a microphone —62— and a source of potential —63— whereby electrical variations corresponding to sound wave variations are amplified and impressed upon the circuit containing the lamp —30—.

In certain cases and with perhaps somewhat less satisfactory results, I may substitute for the worm and worm gear herein shown and described spiral bevel gears for driving the shaft which carries the feed and take-up sprocket.

Additional stages of amplification as desired may be inserted in a well known manner.

Altho I have shown and described a specific construction as illustrative of a perhaps preferred embodiment of my invention, I do not desire to restrict myself to the details of the structure or to the particular embodiment thereof herein disclosed, as various changes may be made in the details of the structure and arrangement of the parts thereof, all within the scope of the appended claims.

I claim:

1. The combination with a moving picture camera including a casing, a feed and take-up sprocket mounted for continuous rotation and around which a film is adapted to move during the taking of moving pictures, of a tube penetrating the casing adjacent the feed and take-up sprocket, a lamp within the tube, means for varying the light rays emanating from said lamp in accordance with sound waves, a jaw holder block mounted on the inner end of said tube, jaws mounted on said jaw holder block and forming between them a narrow slot for the passage of light rays from said lamp to said film.

2. The combination with a moving picture camera including a casing, a feed and take-up sprocket mounted for continuous rotation and around which a film is adapted to move during the taking of moving pictures, of a tube penetrating the casing adjacent the feed and take-up sprocket, a lamp within the tube, means for varying the light rays emanating from said lamp in accordance with sound waves, a jaw holder block mounted on the inner end of said tube, jaws mounted on said jaw-holder block and forming between them a narrow slot for the passage of light rays from said lamp to said film, and means for adjusting one of said jaws to vary the width of said slot.

3. The combination with a moving picture camera including a casing, a feed and take-up sprocket mounted for continuous rotation and around which a film is adapted to move during the taking of moving pictures, of a tube penetrating the casing adjacent the feed and take-up sprocket, a lamp within the tube, means for varying the light rays emanating from said lamp in accordance with sound waves, a closure provided with a slot mounted upon the forward end of said tube, and having a forwardly and downwardly inclined front face lying substantially tangential to the feed and take-up sprocket.

4. The combination with a moving picture camera including a casing, a feed and take-up sprocket mounted for continuous rotation and around which a film is adapted to move during the taking of moving pictures, of a tube penetrating the casing adjacent the feed and take-up sprocket, a lamp within the tube, means for varying the light rays emanating from said lamp in accordance with sound waves, a jaw holder block mounted upon the forward end of said tube and having a forwardly and downwardly inclined front face lying substantially tangential to the feed and take-up sprocket, jaws mounted in the forward face of said jaw-holder block and forming between them a narrow elongated slot permitting the passage of light rays from said lamp to a film while the latter is moving around said sprocket.

5. The combination with a moving picture camera including a casing, a feed and take-up sprocket mounted for continuous rotation and around which a film is adapted to move during the taking of moving pictures, of a tube penetrating the casing adjacent the feed and take-up sprocket, a lamp within the tube, means for varying the light rays emanating from said lamp in accordance with sound waves, a cap mounted upon the forward end of said tube and substantially enclosing the forward end of said lamp and provided with a forwardly and downwardly inclined front face substantially tangential to the feed and take-up sprocket, and provided with a narrow slot permitting the passage of light rays from said lamp to said film as the latter passes around said sprocket.

6. The combination with a moving picture camera including a casing, a feed and take-up sprocket mounted for continuous rotation and around which a film is adapted to move during the taking of moving pictures, of a tube penetrating the casing adjacent the feed and take-up sprocket, a lamp within the tube, means for varying the light rays emanating from said lamp in accordance with sound waves, a jaw-holder block mounted upon the forward end of said tube and having a forwardly and downwardly inclined front face lying substantially tangential to the feed and take-up sprocket, jaws mounted in the forward face of said jaw-holder block and forming between them a narrow elongated slot permitting the passage of light rays from said lamp to a film while the latter is moving around said sprocket, and means for driving said sprocket including a worm and a worm gear.

7. The combination with a moving picture camera including a casing, a feed and take-up sprocket mounted for continuous rotation and around which a film is adapted to move during the taking of moving pictures, of a tube penetrating the casing adjacent the feed and take-up sprocket, a lamp within the tube, means for varying the light rays emanating from said lamp in accordance with sound waves, a cap mounted upon the forward end of said tube and substantially enclosing the forward end of the same and provided with a forwardly and downwardly inclined front face substantially tangential to the feed and take-up sprocket, and provided with a narrow slot permitting the passage of light rays from said lamp to said film as the latter passes around said sprocket, and means for driving said sprocket, including a worm and a worm gear.

8. The combination with a moving picture camera including a casing and a feed and take up sprocket around which a film is adapted to move during the taking of moving pictures, of a lamp casing penetrating the camera casing adjacent the feed and take up sprocket, a lamp within the lamp casing, means for varying the light rays emanating from said lamp in accordance with sound waves, said lamp casing having a narrow opening in its front end for the passage of light rays, said lamp casing being movable toward and from the periphery of the feed and take up sprocket so as to be capable in one position, of tightly pressing a film against the periphery of the sprocket at the light opening, and in another position to permit the threading of the film upon the sprocket.

In witness whereof I have hereunto set my hand this 7th day of August 1924.

THEODORE WILLARD CASE.